April 7, 1964  F. E. BUSCHBOM  3,128,081
SILO UNLOADER TRIPOD
Filed March 30, 1960
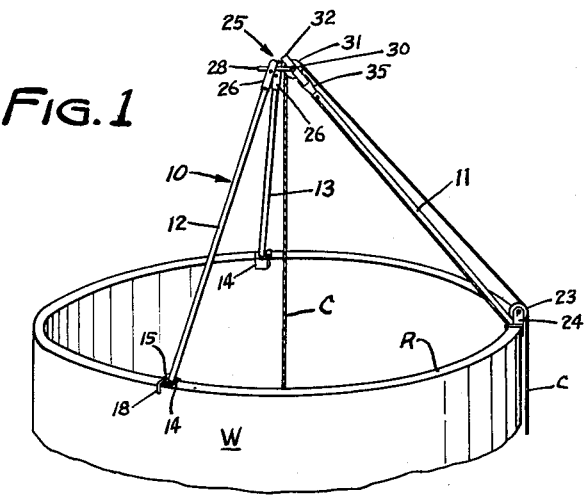
FIG. 1
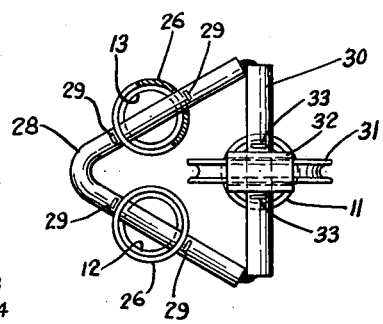
FIG. 2
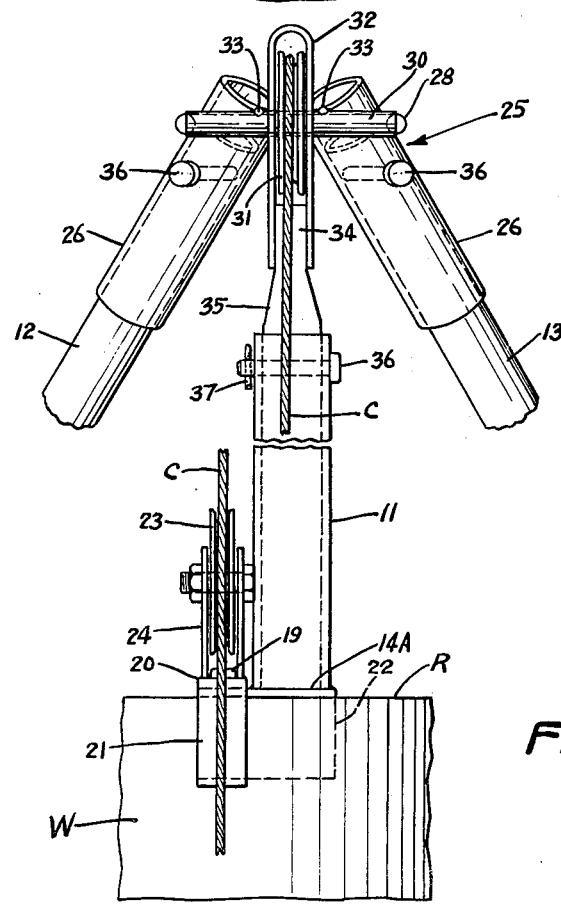
FIG. 3
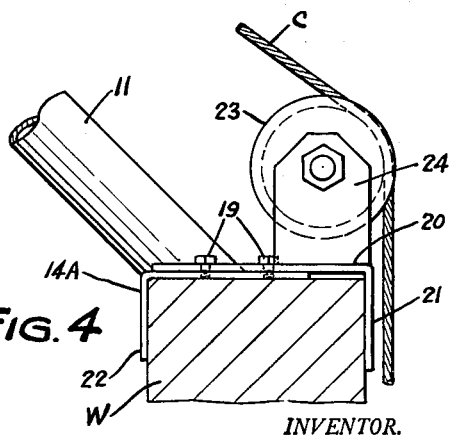
FIG. 5
FIG. 4
INVENTOR.
FLOYD E. BUSCHBOM
BY
ATTORNEYS

United States Patent Office 3,128,081
Patented Apr. 7, 1964

3,128,081
SILO UNLOADER TRIPOD
Floyd E. Buschbom, Long Lake, Minn., assignor to Vandale Corporation, Long Lake, Minn., a corporation of Minnesota
Filed Mar. 30, 1960, Ser. No. 18,697
4 Claims. (Cl. 254—139)

This invention relates to a silo unloader tripod or the like. The tripod of the invention is primarily intended for the suspension of a silo unloader within a tower silo and to solve the problems engenered in positioning such tripod on the top rim of a tower silo, usually many feet above ground, and in adequately supporting a heavy piece of machinery at such an elevation, yet permitting effective letdown and elevation of the unloader within the silo as well as adequate rotation and partial suspension of the unloader within the silo during operation. Nevertheless, as will be understood, the invention may be utilized in a variety of different situations where functional supporting strength, ease of assembly and disassembly, etc. are desired characteristics.

It is therefore an object of this invention to provide a new and useful tripod support having unique means for positioning it on the rim of a tower silo or the like.

A further object of this invention is the provision of a new and useful tripod support in which the legs and center assembly are removably connected.

Yet a further object of this invention resides in the provision of a new and useful sheave means for a tripod support.

Still a further object of this invention resides in the co-operation of new and useful sheave means with the leg and center assembly.

Yet a further object of this invention is the provision of a tripod support which may readily be assembled and disassembled and readily installed upon a substantially elevated supporting surface.

Another object of this invention is the provision of a tripod means which may be readily assembled and disassembled yet provides sturdy and unique construction when assembled.

Yet a further object of this invention resides in the manner in which the sheaves are secured upon such tripod means.

A further object of this invention resides in the new and unique center assembly for the tripod.

A further object of this invention resides in the co-operation and positioning of the tripod supporting legs.

Still further objects of this invention reside in specific structural detail of the means for supporting the tripod legs on the silo rim, the center sheave supporting means and its cooperation with the tripod legs, the rim sheave and its cooperation with its associated leg structure and the other structural details of the invention.

Still further objects of this invention are those which are apparent and inherent in the structure as described, pictured and claimed and will become more evident as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Reference is now made to the drawings in which corresponding numerals refer to the same parts and in which:

FIGURE 1 is a perspective view of the tripod of this invention in position upon the upper rim of a tower silo, the silo wall being shown in fragmentary perspective;

FIGURE 2 is a plan view of the center assembly structure of the tripod;

FIGURE 3 is a fragmentary enlarged elevational view showing one of the tripod supporting legs and the center assembly;

FIGURE 4 is a fragmentary elevational view showing the rim sheave and its supporting structure; and FIGURE 5 is a fragmentary elevational view showing the means for positioning the tripod legs on the silo wall.

Reference is now made specifically to FIGURE 1. In that figure is shown the upright wall W of a tower silo, shown in fragmentary illustration. The wall W is usually of right circular cylindrical section and extends upward into the air to a substantial elevation. It is provided with a top rim R, and may be of any suitable construction, such as wood, concrete stave, or the like.

The tripod assembly 10 of this invention is adapted to be positioned on the upper rim R as shown in FIGURE 1 and consists of three legs, the primary or sheave supporting leg 11 and the secondary legs 12 and 13. Legs 12 and 13 as shown in FIGURE 3 are of substantially identical diameter whereas the diameter of leg 11 is substantially greater for the purpose subsequently to be described.

Each of the legs 12—13 is provided with an angular foot 14 welded or otherwise secured thereto which in turn is provided with a sleeve 15 as shown in FIGURE 5, which is adapted to receive the bar or rod 16. The bar 16 has portions 17 and 18 which extend downwardly over the top rim R of the silo wall, as shown in FIGURE 5 when the foot 14 is in position on the rim.

In the steps of positioning the foot 14 on the rim R it is first positioned as shown in FIGURE 5. Then, rod 16 which is initially provided with its end 18 in prolongation of the middle portion 19 of the rod, is passed through sleeve 15 and end 18 assumes the dotted line position shown in FIGURE 5. End 18 is then bent by blows from a hammer or other fashion to the full line position of FIGURE 5 and the two ends 17 and 18 depend to position the foot 14 securely on the rim, and serve as a safety device to keep it from sliding off. When it is desired to remove the foot 14 from the rim, it may merely be lifted upwardly.

While it is customary, as described above, to bend end 18 after positioning on the rim so that ends 17 and 18 lie closely adjacent the outer surfaces of the wall it may first be bent and then foot 14 positioned on the rim R as shown in FIGURE 5, with the ends 17 and 18 being guided into position.

The foot 14A for leg 11 is not provided with the sleeve 15 and does not use the rod 16. Instead, it is apertured to provide for the reception of two bolts 19 which may either terminate in and be threaded into foot 14A, as shown, or passed therethrough and provided with nuts, if desired. Secured to foot 14A by these bolts 19 is an angle member 20 having a portion 21 depending as shown in FIGURE 4 so that flange 22 of foot 14A and portion 21 provide a U-member for maintaining the foot 14A in position on the rim R of the silo wall, similarly to the bar 16 for foot 14 of legs 12 and 13 of FIGURE 5. Secured to the upper surface of member 20 is a sheave 23 journalled in a supporting bracket 24, welded or otherwise secured to member 20.

The tripod of this invention includes a removable center assembly, generally designated 25, and positioned at the upper end of the tripod when it is in use, as shown in FIGURES 1 and 3. The center assembly 25 consists of two stub sleeves or tubular members 26, each of which is apertured in cooperation with an aperture in the upper end of each of members 12 and 13 for the reception of a pin 36. These pins 36 maintain the stub sleeves 26 in position on legs 12 and 13, and are secured in place by cotter keys identical with key 37, as shown for the pin 36 for leg 11 in FIGURE 3. The upper end of each sleeve 26 is apertured for the reception of one of the arms of V-bar 28. Each arm of V-bar 28 is provided with stops 29 welded or otherwise secured thereto for positioning the sleeve 26 on its respective arm, as shown in FIGURE 2. The apertures in sleeve 26 for receiving the arms of V-bar 28 are slightly larger than the outside diameter of the arms of V-bar 28 to permit rotary movement of the arms therein. The stops 29 preclude substantial axial movement of these arms in sleeves 26.

A straight rod 30 has its ends welded or otherwise secured to the ends of V-bar 28 as shown in FIGURE 2. Rod 30 serves as a bearing shaft for the center sheave 31 journalled thereon. The sheave 31 is positioned by a bifurcated hanger 32 which is precluded from axial movement by stops 33, joined to the surface of bar 30. Hanger 32 is welded or otherwise secured to the flattened end 34 of a truncated tubular member 35. Tubular member 35 has an outside diameter at its other end slightly less than the inside diameter of leg 11, and is positioned therein. Member 35 and the upper end of leg 11 have cooperating apertures for the reception of pin 36 secured in position by the cotter key 37, as shown in FIGURE 3.

The silo unloader supporting cable C extends upwardly from the center of the tower silo over the sheave 31 and interior of hanger 32, down in parallel along leg 11 and over sheave 23.

As will be appreciated, the larger diameter of leg 11 (with reference to the smaller diameter of legs 12 and 13) serves to accommodate the substantial thrust produced by the supporting of the silo unloader or other like object from the cable C when it is positioned as shown in FIGURE 1. Sheaves 23 and 31 cooperatively provide for effective elevation or depression of the cable C by appropriate means such as a winch. The penetration of the cable C through hanger 32 precludes its inadvertent removal from sheave 31.

It will be readily appreciated that use of the center assembly (which is releasibly attached to the leg) permits use of legs of greater or lesser extension. The pivotal connection of the members 26 and 35 to the V-bar 28 and bar 30 allows the legs to be positioned at a greater or lesser angle, as for example, in use with silos of larger diameter.

Thus, as will be appreciated, there is provided a tripod assembly which may readily be assembled and disassembled, even at elevated positions, which permits ready and easy installation on the rim of a tower silo, yet precludes inadvertent disengagement therefrom, which permits construction of lighter material but insures ample strength for supporting substantial loads, which provides ease of manufacture and which fulfills the foregoing listed objects of the invention.

It is apparent that many modifications and variations of this invention as hereinbefore set forth may be made without departing from the spirit and scope thereof. The specific embodiments described are given by way of example only and the invention is limited only by the terms of the appended claims.

What is claimed:
1. A supporting tripod assembly adapted to be positioned upon a rim of a tower silo or the like comprising three supporting legs, two of said supporting legs being of smaller diameter than the third of said supporting legs, said two supporting legs of smaller diameter each being provided with an angular foot having a portion adapted to rest upon the top horizontal surface of said rim and a portion adapted to engage the inner vertical surface of said rim, sleeve means secured thereto for receiving a U-bar having a first end adapted to engage said portion of said supporting foot adapted to engage said vertical surface and a second portion adapted to engage the outer vertical surface of said rim, said third leg having a foot having a portion adapted to rest upon the horizontal surface of said rim and a depending portion adapted to engage the inner vertical surface of said rim and removable means providing a second depending portion adapted to engage the outer vertical surface of said rim.

2. A supporting tripod assembly adapted to be positioned upon a circular rim of a tower silo or the like comprising first, second and third supporting legs, said first and second of said legs each being provided with an angular foot having a portion adapted to rest upon the top horizontal surface of said rim and a portion adapted to engage the inner vertical surface of said rim, apertured means on said angular foot extending in a direction transverse of said silo rim, an inverted U-bar means for positioning said foot on said rim extending through said apertured means, said third leg having a foot having a portion adapted to rest upon the horizontal surface of said rim and a depending portion adapted to engage the inner vertical surface thereof and means for positioning said foot on said rim.

3. In an improved tripod assembly for silo unloaders of the type having legs comprising two members and a hollow member that engage the top rim of a silo and having means for supporting a silo unloader, the improvement comprising, a separable center assembly comprising three tubular members, two of said tubular members being of larger diameter than the third tubular member and each adapted to receive one of said two members inside thereof, two members engaged inside said two tubular members of larger diameter, releasable means securing said two tubular members to said two members, a V-bar means, each of said tubular members being pivoted to an arm of said V-bar means, means precluding substantial movement of said tubular members axially of said arms, a sheave, a hanger means, means joining the ends of said V-bar means and serving as a supporting shaft for said sheave and hanger means, means precluding substantial movement of said sheave and said hanger means axially of said means joining the ends of said V-bar means, said sheave being positioned interior of said hanger means, said third tubular member being joined to said hanger means, a hollow member, said third tubular member adapted to be positioned interior of said hollow member and releasable means for securing said third tubular member to said hollow member.

4. A supporting tripod assembly adapted to be positioned upon a rim of a tower silo or the like comprising three supporting legs, two of said supporting legs being of smaller diameter than the third of said supporting legs, said two supporting legs of smaller diameter each being provided with an angular foot having a portion adapted to rest upon the top horizontal surface of said rim and a portion adapted to engage the inner vertical surface of said rim, sleeve means secured thereto, a U-bar having a first end adapted to engage said portion of said supporting foot adapted to engage said inner vertical surface and a second portion adapted to engage the outer vertical surface of said rim, removable foot means secured to said third tubular member providing a depending portion adapted to engage the outer vertical surface of said rim, a first sheave secured to said removable foot means, a separable center assembly comprising first, second and third tubular members, the first and second of said tubular members being of larger diameter than the third of said tubular members and each adapted to fit over the upper end of one of said smaller diameter supporting legs, releasable means securing said tubular members to said legs, a V-bar means having arms, each of said tubular members being pivoted to an arm of the V-bar means, means precluding substantial movement of said tubular members axially on said arms, a second sheave, a hanger means, means joining the ends of said V-bar means arms and serving as a supporting shaft for said second sheave and for said hanger means, means precluding substantial movement of said second sheave and hanger means axially of said means joining the ends of said V-bar, said second sheave being positioned interior of said hanger means, a third tubular member being joined to said hanger means and adapted to be positioned interior of said third leg and releasable pin means for securing them together.

References Cited in the file of this patent

UNITED STATES PATENTS

| | | |
|---|---|---|
| 1,144,726 | Robinson et al. | June 29, 1915 |
| 1,214,104 | Wingire | Jan. 30, 1917 |
| 1,725,980 | Fahrenback et al. | Aug. 27, 1929 |
| 1,789,317 | McLeish | Jan. 20, 1931 |
| 2,293,847 | Pearson | Aug. 25, 1942 |